United States Patent [19]

Koehler

[11] 4,436,471
[45] Mar. 13, 1984

[54] METHOD AND APPARATUS FOR STACKING FOR BARS AND THE LIKE

[76] Inventor: Charles F. Koehler, c/o American Drawn Steel Corporation, P.O. Box 54, Allison Park, Pa. 15101

[21] Appl. No.: 230,751

[22] Filed: Feb. 2, 1981

[51] Int. Cl.³ .............................................. B65G 57/03
[52] U.S. Cl. ........................................ 414/36; 414/51; 414/86; 414/748
[58] Field of Search ....................... 414/35, 36, 51, 53, 414/69, 86, 748, 745

[56] References Cited

U.S. PATENT DOCUMENTS

| | | | |
|---|---|---|---|
| 2,822,932 | 2/1958 | Patrick | 414/51 |
| 3,288,038 | 11/1966 | Swartz | 414/53 X |
| 3,533,319 | 10/1970 | Addis | 414/51 X |
| 3,712,486 | 1/1973 | Lopez | 414/36 |
| 3,902,586 | 9/1975 | Hill | 414/36 X |
| 4,016,072 | 4/1977 | Cavenar | 414/748 |

FOREIGN PATENT DOCUMENTS 1005823  4/1957  Fed. Rep. of Germany ........ 414/53

Primary Examiner—Leslie J. Paperner
Assistant Examiner—Ken Muncy
Attorney, Agent, or Firm—Buell, Blenko, Ziesenheim & Beck

[57] ABSTRACT

The specification discloses stacking of bars and the like. A plurality of stacking cradles are positioned adjacent to a table from which bars are moved transversely to the stacking cradles. Deflector members are selectively movable between a position in which they bridge over the stacking cradle and a position leaving the stacking cradles open. Members are provided for shifting the product in the stacking cradles for alignment of the ends of the product.

9 Claims, 6 Drawing Figures

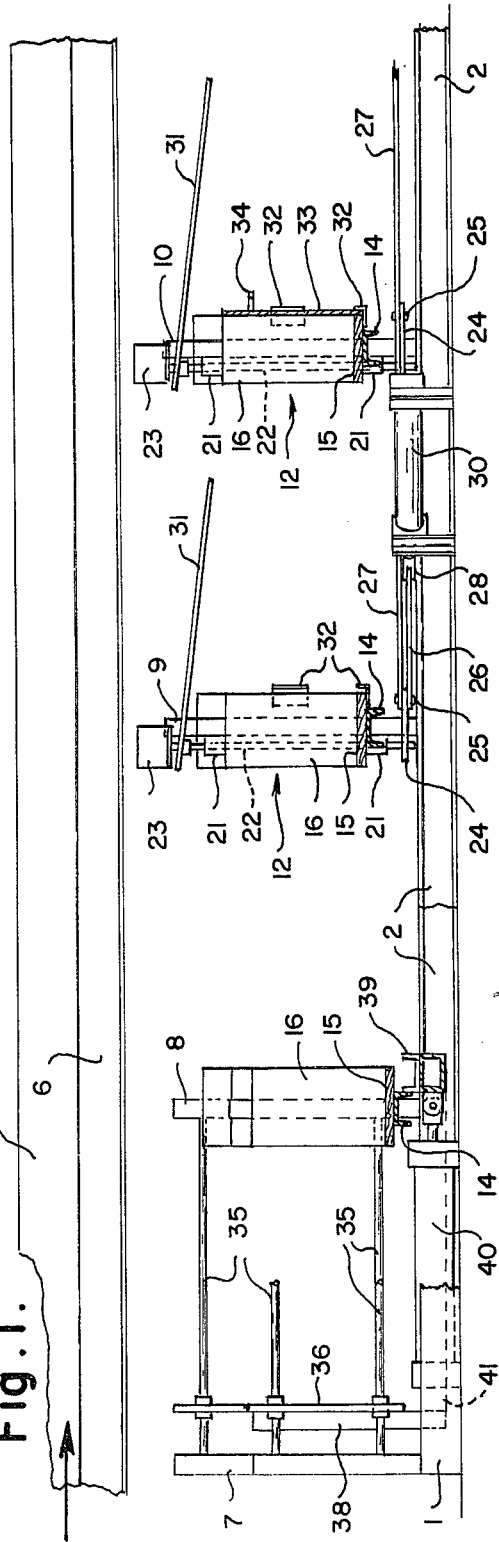
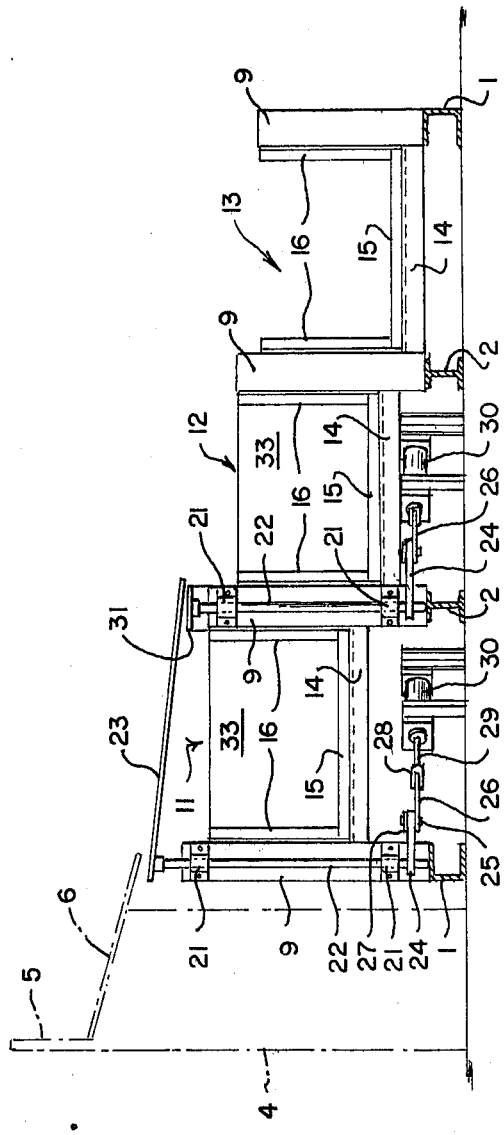
Fig. 1.
Fig. 3.

METHOD AND APPARATUS FOR STACKING FOR BARS AND THE LIKE

This application relates to methods and apparatus for stacking of bars and the like so that they may be bundled for further handling and shipping. More particularly this invention relates handling elongated products such as bars which issue from a shear onto a table and are then stacked and aligned end-to-end for further handling.

The production of long thin articles such as bars and the like, e.g. rod and tubing, is well known in many production lines. In some instances a product is produced in separate lengths at high speed. In other instances, a continuous product is produced and is sheared on the fly. In either case, it is necessary to handle each discrete length of product with some type of apparatus. A common arrangement includes some type of table onto which lengths of product are delivered longitudinally and from which they are removed by transverse movement. Where small diameter products are involved the production speed is often very high and problems are presented in handling the material as it issues from the production line. As the speed of production increases, the problems of handling the product become increasingly greater due to the speed at which product is delivered to the table.

I provide stacking apparatus for bars and the like comprising a run-in table to receive bars and the like from a production line, a plurality of stacking guides generally aligned with and parallel to the run-in table and deflector means operable to bridge over the stacking guides intermediate the run-in table and the stacking guide most remote from the run-in table. I provide deflector means which are operable between a position bridging over the stacking guides and an inactive position in which the stacking guides are open to receive product from the run-in table. I position the deflector means to receive product from the run-in table to deflect product across the associated stacking guide and alternatively to permit product to be received into the stacking guide. I prefer to connect all deflector means associated with each stacking guide for movement of said deflector means between a bridging position and a non-bridging position independently of movement of the deflector means associated with any other stacking guide. I prefer to provide fluid piston means for movement of the deflector means between bridging and non-bridging positions.

I further prefer to provide pusher means associated with the stacking guides for alignment of product within the stacking guides. Preferably I provide pusher means which will simultaneously axially push the product in all stacking guides. I further prefer to provide removable stop means which may be fitted to each stacking guide to resist movement of product being pushed in the stacking guide by the pusher means.

Other details, objects, and advantages of my invention will become more apparent as following description of a present preferred embodiment thereof proceeds.

In the accompaning drawings I have illustrated a present preferred embodiment of my invention in which:

FIG. 1 is a side elevational view of apparatus embodying my invention taken partly in section along line 1—1 of FIG. 2, with one end cut away to eliminate duplication of parts;

FIG. 3 is an end sectional view of the apparatus shown in FIG. 1 taken along line III—III of FIG. 2;

Figure 2:
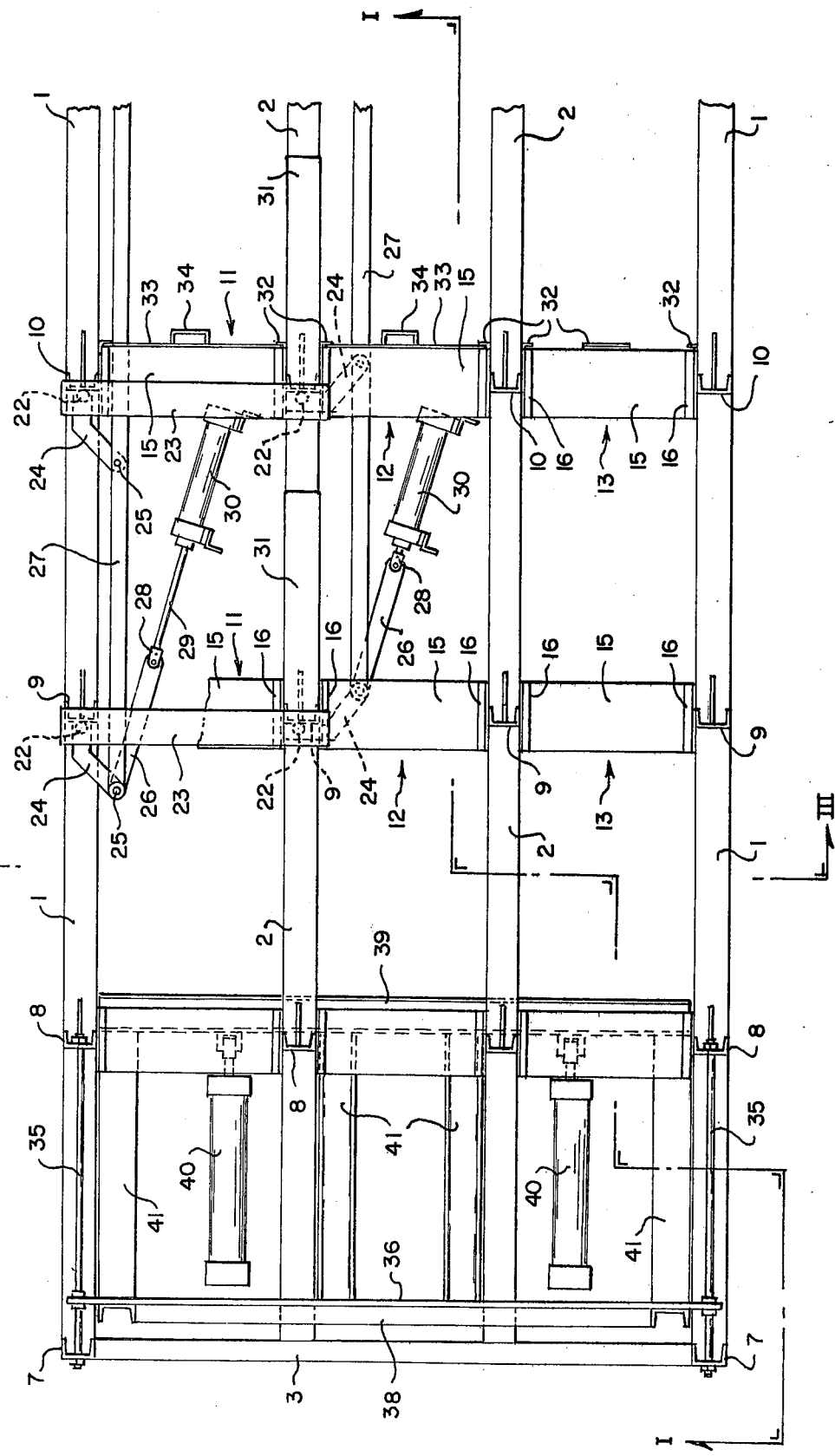
FIG. 2 is a top plan view of the apparatus shown in FIG. 1.

The stacking apparatus is mounted on a series of longitudinal parallel rails in the form of channels 1 and I-beams 2 which are fixed to the floor of the mill. The rails are further maintained in spaced parallel relationship by one or more transverse members 3 welded to them and by the stacking cradles.

A product run-in table is positioned along one side of the stacking apparatus. It comprises a base 4, a back guide 5 and a apron 6 which slopes down from the back guide toward the stacking apparatus. Bars which have been cut to length by a shear are delivered at high speed onto the run-in table. As they reach the table they roll down the slope of apron 6. Kickoff means may be incorporated to push the bar down the apron but are not normally required. Bars are delivered to the run-in table in the direction shown by the arrow in FIG. 1.

Vertical posts 7, 8, 9 and 10 are mounted on channels 1 and I-beams 2. Posts 7, 8, 9, and 10, respectively, are arranged in rows which are transverse to the axis of the run-in table and the stacking apparatus. Only the bar entry end of the stacking apparatus is shown in the drawings. It will be understood that stacking apparatus of greater length will commonly be provided having additional rows of posts and associated fittings. Increase of length does not change the operation of the apparatus, however, and repetitive parts have been omitted from the drawings for clarity of illustration.

Figure 6:
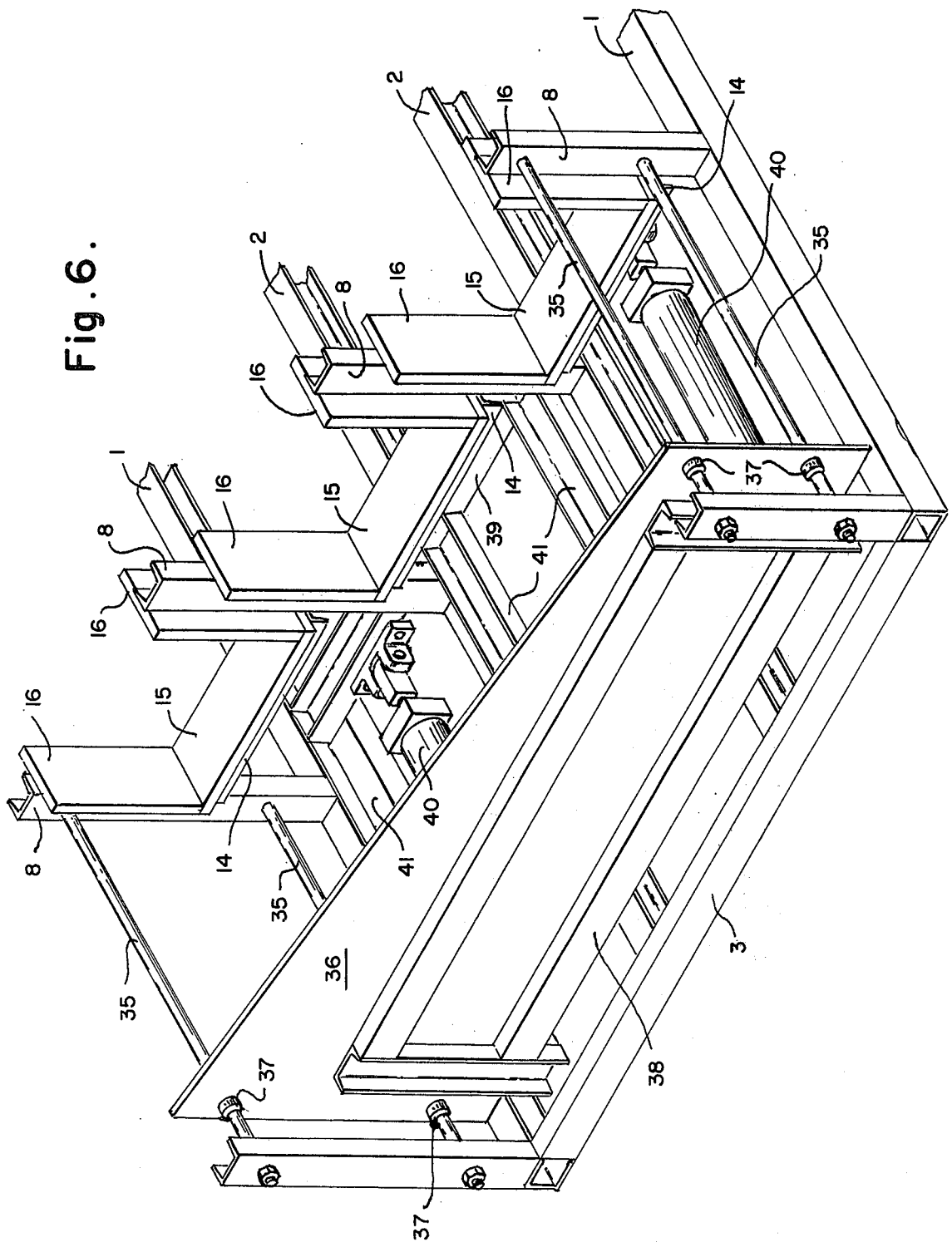
FIG. 6 is a perspective view of one set of stacking cradles showing the bar pusher mechanism.

Stacking cradles 11, 12 and 13 are mounted between posts 8 (FIGS. 1, 2 and 6). Each stacking cradle comprises a channel 14 which is connected to and extends horizontally between adjacent posts 8. A wooden pad 15 is positioned on channel 14 extending between posts 8. Vertical wooden pads 16 are attached to a post 8 at each end of pad 15. Pads 15 and 16 are preferably attached to and removable from steel backing plates which attached directly to posts and channels 14. In that manner wooden pads 15 and 16 may readily be replaced when worn. Similar stacking cradles are fitted between posts 9 and posts 10 and are given numbers corresponding to the aligned stacking cradles associated with posts 8. Stacking cradles 11 are aligned, as are stacking cradles 12 and 13. The plurality of stacking cradles 11 forms a stacking guide as do stacking cradles 12 and stacking cradles 13. Colored bands 17, 18, 19 and 20 are painted on at least some of vertical wooden pads 16. The bands serve as guides to show the exact depth to which bars have been stacked within cradles 11, 12 and 13.

Figure 4:
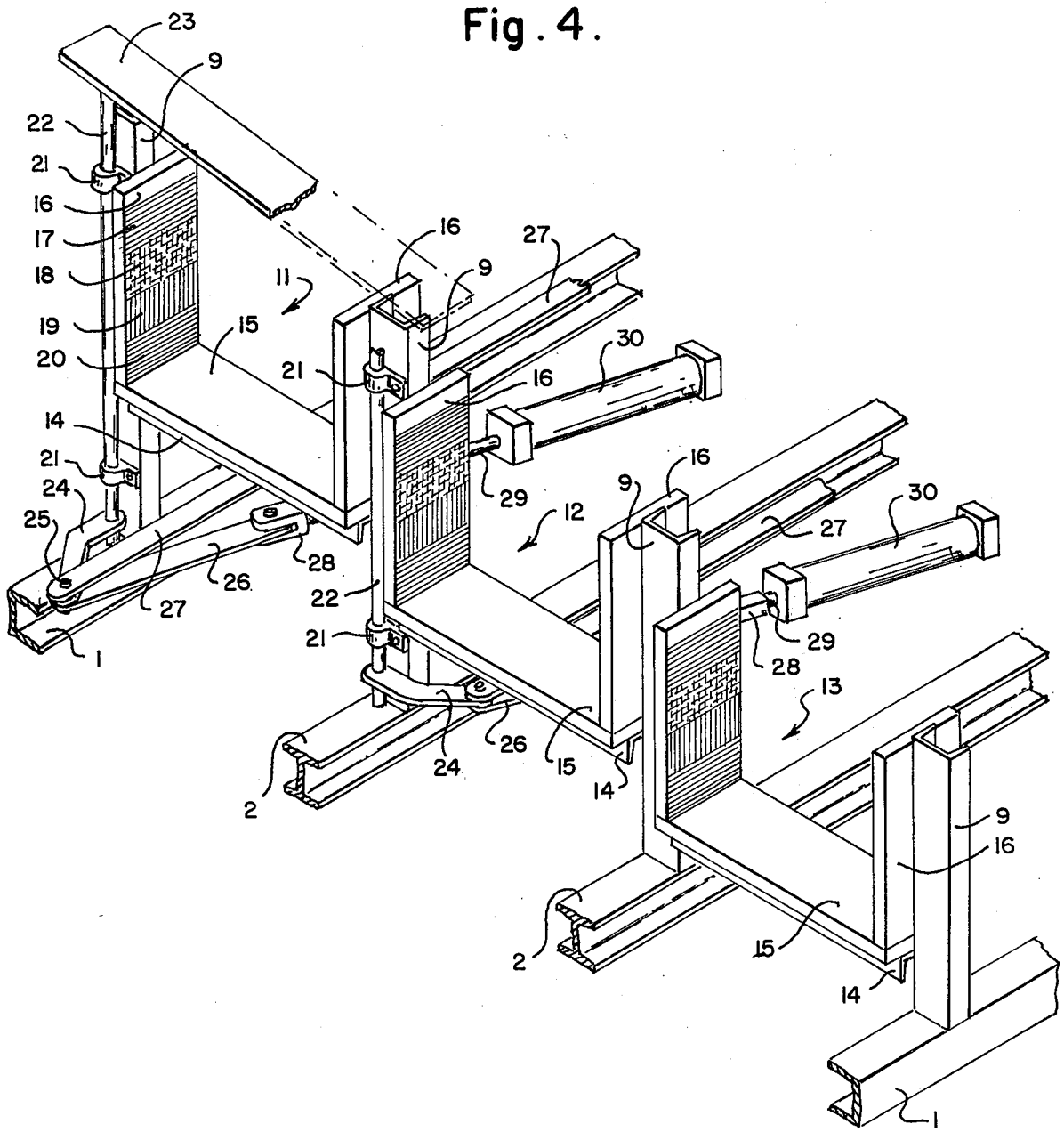
FIG. 4 is a perspective view of one set of stacking cradles, product deflector means, and deflector operating means.

Gudgeons 21 are bolted to post 9 which is closest to the run-in table (FIG. 4). A shaft 22 is vertically and pivotally mounted in gudgeons 21 with its lower end resting against channel 1. A deflector bar 23 is connected to rod 22 sloping downwardly from rod 22 toward stacking cradle 12. Rotation of rod 22 will move deflector bar 23 between a position in which it bridges across the associated stacking cradle, as shown in FIG. 4, and a position in which it is parallel to the axis of bars in stacking cradle 11. The end of deflector bar 23 which is connected to rod 22 is positioned beneath the lip of apron table 6 as shown in FIG. 3.

A crank 24 is connected to rod 22. The end of crank 24 remote from rod 22 is pivotally connected by a pin 25 to links 26 and 27. Link 26 is pivotally connected to a clevis 28 on the end of piston rod 29 actuated by movement of a piston in double-acting fluid power cylinder 30 which is mounted to the floor.

A similar deflector bar 23 is mounted on post 10 closest to the run-in table and a like deflector bar is mounted to each succeeding post down the length of the stacking apparatus. Operating rod 22 for each deflector bar is connected by crank 24 to link 27. A similar deflector bar 31 is mounted adjacent each stacking cradle 12. Each deflector plate 31 is mounted in the same manner upon a vertical shaft and is operated between a bridging position and an inactive or open position by a fluid power cylinder. Like parts in the operating mechanism for deflector bars 31 are identified by the same numbers as the operating mechanism for deflector bars 23. In FIG. 2 deflector bars 31 are shown in inactive position in which they are clear of stacking cradles 12. The elevation of deflector bars 31 is below the elevation of deflector plates 23 as seen in FIG. 3. Accordingly, when deflector bars 23 are in bridging position the movable ends of deflector bars 23 are located above the ends of deflector bars 31 attached to the associated operating rods 22. No deflector bars are provided for stacking cradles 13 which are the cradles most remote from the run-in table.

Stays in the form of clips 32 are fitted to at least some of the stacking cradles. Clearance is provided between the lips of clips 32 and pads 16 to permit stop plates 33 to be dropped in position between the clips and the stacking cradles and to retain plates 33 upright. A handle 34 is provided on one side of each stop plate 33 to make installation and removal of the stop plate more convenient. The stop plate may be moved from one cradle to another along the length of the stacking apparatus dependant upon the length of bars which are to be stacked.

Bar pusher apparatus is fitted at the bar entry end of the stacking apparatus. Guides 35 extend between vertical posts 7 and posts 8 which are mounted upon channels 1. A bar pusher plate 36 having bushings 37 is mounted upon guides 35 and can slide between posts 7 and posts 8 on guides 35. A stiffening framework 38 is mounted to the back of bar pusher plate 36. A cross-head 39 rests on I-beams 2 between posts 8 and posts 9. Cross-head 39 is movable between posts 8 and post 9 by the action of double-acting fluid power cylinders 40 which are attached to the floor. Cross-head 39 is attached to framework 38 by longitudinal members 41. (The longitudinal member furthest from run-in table has been omitted from FIG. 6 for clarity of illustration).

In operation of the apparatus the length of bars which are to be stacked is first selected. For purposes of illustation it will be assumed that bars of relatively short length will be cut such that the bars will rest in the stacking cradles mounted between posts 8, 9 and 10. If longer bars where to be cut they would extend beyond the stacking cradles between posts 10 and would rest in like cradles which are located beyond the edges of the drawings.

Figure 5:
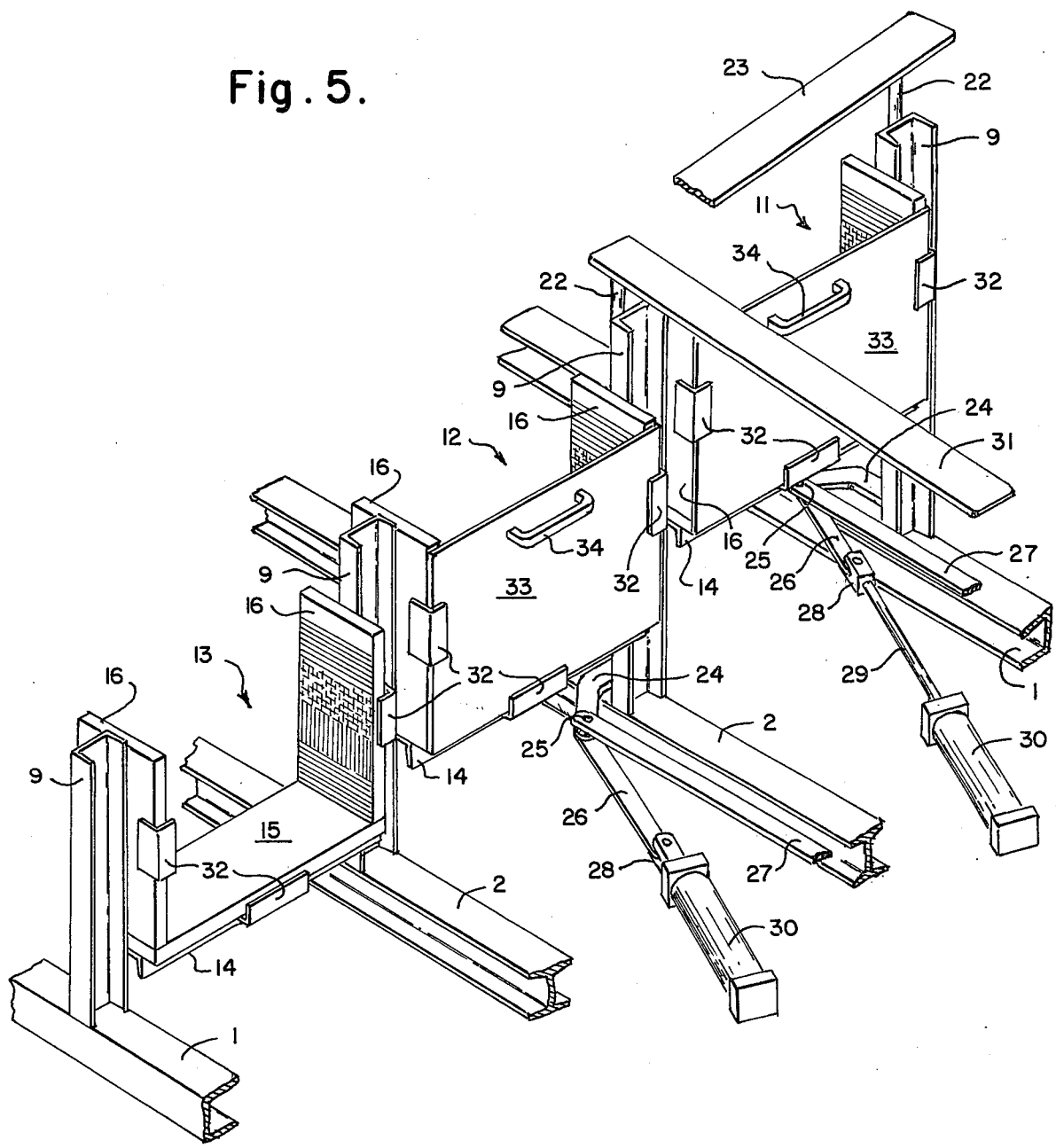
FIG. 5 is a perspective view of one set of stacking cradles showing product stop plates inserted in two of the stacking cradles.

Stop plates 33 are fitted to each of the stacking cradles between posts 10. Stop plates may be installed in stacking cradles 11 and 12 as shown in FIG. 2 and 5 and will additionally be installed in stacking cradle 13. The piston rods of fluid power cylinders 40 are retracted. They draw cross-head 39 toward posts 8 and push bar pusher plate 36 toward posts 7. The piston rods of cylinders 30 are retracted to swing deflector bars 23 and 31 to inoperative position in which they will leave the associated stacking guides open to receive product and will be parallel to the run-in table as deflector bars 31 are shown in FIG. 2. The bar feeding and cutting apparatus is then started and lengths of bars are delivered to the run-in table. As the bars reach the run-in table they will roll down the surface of apron 6 and into stacking cradles 11 between posts 8, 9 and 10. The forward ends of the bars will come to rest in stacking cradle 11 between posts 10. The ends of the bars may bump against stop plates 33, but there will be other bars whose ends are spaced from stop plates 33. The three stacking cradles 11 between posts 8, 9 and 10 serve as a stacking guide and gradually build a stack of bars as they are delivered from the run-in table. Colored bands 17, 18, 19 and 20 will give an indication of the amount of product which has been delivered to the stacking guide. When a number of bars to form a desired size of bundle has been placed in the stacking guide comprising cradles 11, cylinder 30 associated with deflector bars 23 is operated to swing deflector bars 23 into bridging position over stacking cradles 11 as shown in FIGS. 2 and 4. Bars then being delivered from the run-in table will roll across deflector bars 23 and into the stacking guide formed by stacking cradles 12. The process of accumulating bars to form a bundle is repeated in stacking cradles 12 at which time piston 30 associated with deflector bars 31 is operated to move bars 31 to bridging position. Bars delivered from the run-in table then roll across deflector bars 23 and 31 and are delivered into the stacking guide formed by cradles 13. The process of building a bundle is repeated in stacking cradles 13. When stacking cradles 13 have been filled to the desired level the line is shut down. Power is applied to cylinders 40. Operation of cylinders 40 moves bar pusher plate 36 toward posts 8 and forces the bars in the stacking cradles toward stop plates 33. In that manner the bars are dressed into a bundle with their ends all in substantially the same planes determined by plates 33 and plates 36.

Cylinders 30 are actuated to swing deflector bars 23 and 31 to inoperative position. The bundles are then lifted from the stacking guides by a crane. They may be banded or otherwise prepared for shipping. After removal of the bars from the stacking guides, the line is restarted and the process is repeated.

It will be apparent that the apparatus may be made of any convenient length to accomodate the length of bars being cut. Also it will be apparent that the stacking apparatus can be enlarged transversely by providing additional stacking guides parallel to the run-in table. In that event additional deflector bars are also be provided to carry product over each stacking guide between the run-in table and the stacking guide most remote from the run-in table.

While I have illustrated and described a present preferred embodiment of my invention, it is to be understood that I do not limit myself thereto and that the invention may be otherwise variously practiced within the scope of the following claims.

I claim:

1. Stacking apparatus for bars and the like comprising an elongate run-in table having a feed axis lengthwise of said run-in table, a plurality of stacking guides arranged parallel to the run-in table and offset from the axis thereof at different distances, and bar deflector means associated with at least some stacking guides, each deflector means being rotatable about a vertical axis and movable between a first position substantially transverse to the feed axis in a plane generally sloping from the horizontal in which the deflector means bridge across the stacking guide and a second position in which the deflector means are substantially parallel to the feed axis and are clear of the stacking guide for deposit of bars and the like in the stacking guide, said deflector means when positioned in bridging position acting to receive bars from the run-in table and deflect them from the associated stacking cradle.

2. Stacking apparatus as set forth in claim 1 in which the deflector means are pivotally movable between a bridging position and a non-bridging position.

3. Stacking apparatus as set forth in claim 2 in which power means are operably connected to the deflector means associated with each stacking guide for movement of said deflector means between bridging and non-bridging positions independent of the deflector means associated with other stacking guides.

4. Stacking apparatus as set forth in claim 3 in which each deflector means is positioned below the deflector means next closest to the run-in table.

5. Stacking apparatus as set forth in claim 1 in which product stop plates are removably fitted in the stacking guides.

6. Stacking apparatus as set forth in claim 5 in which plate means are movably positioned for movement against the ends of product resting in the stacking guides.

7. Stacking apparatus for bars and the like comprising an elongate run-in table having a feed axis lengthwise of said run-in table, a plurality of product stacking guides positioned parallel to, offset from the axis of, and below the surface of the run-in table, product deflector means associated with each stacking guide between the run-in table and the stacking guide most remote from the run-in table, each deflector means being positioned below the deflector means next closest to the run-in table, power means in operative connection with the deflector means for operation of the deflector means associated with each stacking guide separate from the deflector means associated with other stacking guides, each deflector means being rotatable about a vertical axis and movable from a first position substantially transverse to the feed axis in a plane generally sloping from the horizontal in which the deflector means bridge across the stacking guide and a second position in which the deflector means are substantially parallel to the feed axis and are clear of the stacking guide for deposit of bars and the like in the stacking guide, product stop means associated with each stacking guide and product pusher means adjacent the entry end of the stacking apparatus movable away from the entry end of the stacking apparatus whereby product in the stacking guides may be pushed against the stop plates.

8. The method of stacking and building a plurality of elongate articles such as bars and the like comprising feeding the product on to a run-in table, providing a plurality of stacking guides alongside and below the run-in table, moving product transversely from the run-in table toward the stacking guides, providing a deflector means associated with each stacking guide, each deflector means being rotatable about a vertical axis and movable from a first position substantially transverse to the feed axis in a plane generally sloping from the horizontal in which the deflector means bridge across the stacking guide and a second position in which the deflector means are substantially parallel to the feed axis and are clear of the stacking guide for deposit of bars and the like in the stacking guide, selectively positioning the deflector means to said first position operable to bridge over each stacking guide, directing product to one of the stacking guides until it is filled to desired level, operating the deflector means to said second position to direct product to the stacking guides, until they are filled to the desired level, moving any deflector means in briding position to inactive position, and removing bundles of product from the stacking guides.

9. The method of claim 8 in which product is pushed in the stacking guides after delivery thereto to dress the ends of the product and align them in a bundle.

* * * * *